(12) United States Patent
Westmijze et al.

(10) Patent No.: US 7,109,275 B2
(45) Date of Patent: Sep. 19, 2006

(54) CO-METERING OF ORGANIC INITIATORS AND PROTECTIVE COLLOIDS DURING POLYMERIZATION REACTIONS

(75) Inventors: Hans Westmijze, Deventer (NL); Koen Antoon Kornelis Vanduffel, Deventer (NL); Lambertus Meulenbrugge, Westervoort (NL); Andreas Petrus Van Swieten, Velp (NL)

(73) Assignee: Akzo Nobel N.V., Arnhem (NL)

( * ) Notice: Subject to any disclaimer, the term of this patent is extended or adjusted under 35 U.S.C. 154(b) by 482 days.

(21) Appl. No.: 10/411,182

(22) Filed: Apr. 10, 2003

(65) Prior Publication Data

US 2003/0199656 A1 Oct. 23, 2003

(30) Foreign Application Priority Data

Apr. 12, 2002 (EP) .................................. 02076430

(51) Int. Cl.
*C08F 2/12* (2006.01)
(52) U.S. Cl. ........................... 526/79; 526/81; 526/86; 526/202; 526/344.2
(58) Field of Classification Search ................ 526/79, 526/81, 86, 202, 344.2
See application file for complete search history.

(56) References Cited

U.S. PATENT DOCUMENTS

| | | | |
|---|---|---|---|
| 3,451,985 A | 6/1969 | Mahlo | 260/92.8 |
| 4,528,315 A | 7/1985 | Eck et al. | 524/458 |
| 5,096,988 A | 3/1992 | Amano et al. | 526/200 |
| 5,204,421 A | 4/1993 | Amano et al. | 526/200 |
| 5,376,747 A | 12/1994 | Shigemitsu et al. | 526/202 |
| 5,478,900 A | 12/1995 | Amano et al. | 526/88 |
| 5,502,123 A * | 3/1996 | Hiyama et al. | 526/88 |
| 5,679,735 A | 10/1997 | Geissler et al. | 524/459 |
| 5,883,209 A | 3/1999 | Nakano et al. | 526/200 |

FOREIGN PATENT DOCUMENTS

| | | |
|---|---|---|
| CA | 2074995 | 2/1993 |
| EP | 718 314 A1 | 6/1996 |
| EP | 718 314 B1 | 6/1996 |
| JP | 05/222104 | 8/1993 |
| JP | 07/053607 | 2/1995 |
| JP | 07/179506 | 7/1995 |
| JP | 08/027206 | 1/1996 |
| JP | 08/231614 | 9/1996 |
| JP | 10/0285307 | 1/1998 |
| JP | 10/045813 | 2/1998 |
| JP | 10/045814 | 2/1998 |
| JP | 10/251311 | 9/1998 |
| JP | 11/302307 | 11/1999 |
| JP | 2000/017006 | 1/2000 |
| JP | 2001/106707 | 4/2001 |
| WO | 00/17245 | 3/2000 |
| WO | WO 00/17245 A1 | 3/2000 |

OTHER PUBLICATIONS

Abstract of JP 08/027206 (1996).
Abstract of JP 11/302307 (1999).
Abstract of JP 2001/106707 (2001).
Abstract of JP 2000/017006 (2000).
Abstract of JP 10/251311 (1998).
Abstract of JP 10/045813 (1998).
Abstract of JP 10/045814 (1998).
Abstract of JP 10/025307 (1998).
Abstract of JP 08/231614 (1996).
Abstract of JP 07/179506 (1995).
Abstract of JP 07/053607 (1995).
Abstract of JP 05/222104 (1993).
Abstract of JP 54/148092 (1979).
Abstract of JP 60/231706 (1985).
Abstract of EP 65,162 (1982).
Abstract of DE 19537936 (1997).

* cited by examiner

*Primary Examiner*—Fred Teskin
(74) *Attorney, Agent, or Firm*—Richard P. Fennelly; Louis A. Morris

(57) ABSTRACT

The invention pertains to a process wherein initiators and protective colloids are both metered to a polymerization mixture. This manner of metering allows for improved control of the polymerization rate and an improved reactor space-time yield, and the process will render a polymer with a relatively high porosity.

10 Claims, No Drawings

CO-METERING OF ORGANIC INITIATORS AND PROTECTIVE COLLOIDS DURING POLYMERIZATION REACTIONS

This application claims priority from European Patent Application No. 02076430.4, filed Apr. 12, 2002.

The present invention relates to a process to polymerize one or more monomers wherein one or more organic initiators are metered to a polymerization mixture at the reaction temperature.

Such a process is known from DE-OS-1 570 963, in which initiators were metered to a polymerization reactor. The initiators employed are organic peroxides such as peroxydicarbonates. The peroxydicarbonates generally have a relatively long half-life ranging from 3.5 to 4.5 hours at a polymerization temperature of 54° C.

Compared to the process of DE-OS-1 570 963, the polymerization rate is improved when using the process described in WO 00/17245, where organic peroxides are metered to a polymerization reactor at temperatures at which the peroxides have a half-life of from 0.05 to 1.0 hour. By selecting the proper peroxide and the proper metering conditions, the heat of polymerization can be controlled at a constant level, resulting in high polymer yields, very efficient peroxide usage, and low residual peroxide levels in the resin after polymerization. Unpublished U.S. Patent application U.S. 60/342,434 discloses a process which allows even shorter polymerization times than WO 00/17245. Here it is taught to meter organic peroxides to a polymerization reactor at temperatures at which the peroxide has a half-life of from 0.0001 to 0.05 hour. This process allows an even better heat control during polymerization, an improved reactor space-time yield, and even lower residual peroxide levels in the resin.

In these reactions, however, it was found that the efficiency of the initiator was generally insufficient, resulting in relatively high dosing levels of the initiator and high levels of undesired decomposition products. Depending on the nature of the decomposition products, the smell and/or color of the resin may be unacceptable. Also, it is known that residual decomposition products typically having a molecular weight of less than 250 Dalton may lead to fogging (the decomposition products evaporate from the resin and condense on another surface), which is undesired.

In EP 718314 a two-step process is disclosed for polymerizing acrylic and methacrylic monomers wherein in the first step large amounts of protective colloid in the range of 4 to 15 wt. % are mixed and heated, after which the solution is cooled down and a monomer mixture is added. In the second step the obtained mixture is again heated in the presence of an organic initiator. The high amount of protective colloids that is necessary results in a very complicated method, with long reactor times (about 7 hours) for making (meth)acrylic polymers.

It is an object of the present invention to provide an improved and simple process, using low amounts of protective colloids and short reactor times, which overcomes the disadvantages of the prior art processes while resulting in resins with desirable properties, such as porosity for PVC resins.

The process of the present invention is a process wherein at least part of the total amount of one or more organic initiators is metered to a polymerization mixture at a reaction temperature and wherein at least part of the total amount of one or more protective colloids is metered.

By metering both the initiator and the protective colloid, the efficiency of the initiator is improved, increasing the polymerization rate and shortening the polymerization times compared to the above-cited art. Moreover, the pressure drop rate was found to increase, which improves the obtainable reactor space-time yield even further. Additionally, the porosity of the polymer can be enhanced and better controlled through selection of the appropriate protective colloid and the way in which the protective colloid and/or the peroxide are metered. A further advantage is that the level of fish eyes is reduced.

The process wherein the peroxide is all charged to the reaction mixture at the beginning of the polymerization reaction and wherein a protective colloid is metered to the mixture is known from U.S. Pat. No. 5,376,747. This process aims to produce a vinyl chloride-based polymer having an effectively reduced number of fish eyes without loss of thermal stability. It does not teach to meter the peroxide in order to achieve a higher polymerization rate, nor does it describe co-metering of the protective colloid and the peroxide, which enhances the said rate even more.

A non-binding theory may explain the working principle of the present invention. The polymerization rate is dependent on the initiation rate ($k_{init}$) of the initiator, which is proportional to an efficiency factor (f) and a decomposition rate ($k_d$). The decomposition rate is inversely proportional to the half-life of the initiator, which is proportional to the temperature-dependent activation factor ($e^{-Ea/RT}$). It will be evident to a skilled artisan that by metering a fast initiator having a shorter half-life, the polymerization rate can be increased because of the higher decomposition rate $k_d$. It is believed that metering of the protective colloid influences the efficiency factor f, particularly for these fast initiators. Therefore, metering of both the initiator and the protective colloid has a synergetic effect on the polymerization rate and increases it to a greater extent compared to varying just the initiator or just the protective colloid.

The process according to the invention is pre-eminently suited for polymerizing monomer mixtures comprising vinyl chloride monomer (VCM). Preferably, the process according to the invention involves the polymerization of monomer mixtures comprising at least 50% by weight (% w/w) of VCM, based on the weight of all monomer. Comonomers that can be used are of the conventional type and include vinylidene chloride, vinyl acetate, ethylene, propylene, acrylonitrile, styrene, and (meth)acrylates. More preferably, at least 80% w/w of the monomer(s) being polymerized is made up of VCM, while in the most preferred process the monomer consists essentially of VCM. As is known in the art, the polymerization temperature of such processes to a large extent determines the molecular weight of the resulting resin.

One or more protective colloids can be used in the process of the invention. Examples of suitable protective colloids are protective colloids such as polyvinyl alcohols (PVAs), which may, for example, be (partially) saponified polyvinyl acetates with a degree of hydrolysis of at least 40%, more preferably 60%, and most preferably 62%, and a degree of hydrolysis of at most 90%, more preferably 85%, and most preferably 80%. If for example two PVAs are employed, both PVAs may have a similar degree of hydrolysis. It may also be envisaged that the two PVAs have a different degree of hydrolysis. A first PVA may have a degree of hydrolysis as described above. A second PVA may have a degree of hydrolysis of at least 10%, more preferably 20%, and most preferably 30%, and a degree of hydrolysis of at most 80%, more preferably 70%, and most preferably 60%. If more than one PVA is used, the indicated degree of hydrolysis generally is the weight-averaged degree of hydrolysis of the products used. Although said PVAs are the preferred protective colloids for processes according to the invention, it is also possible to use other conventional protective colloids, such as cellulosics, water-soluble polymers, oil-soluble emulsifying agents or water-soluble emulsifying agents. Examples of such cellulosics are methyl cellulose, ethyl cellulose, hydroxyethyl cellulose, hydroxypropyl cellulose, and hydroxypropyl methyl cellulose. Examples of water-soluble polymers are polyacrylic acid, gelatin, styrene maleic acid copolymers, and polyvinyl pyrrolidone. Oil-soluble emulsifying agents are, for example, sorbitan monolaurate, sorbitan trioleate, sorbitan monostearate, glycerin tristearate, and ethylene oxide-propylene oxide block copolymers. Examples of water-soluble emulsifying agents are polyoxyethylene sorbitan monolaurate, polyoxyethylene glycerin oleate, and sodium laurate. It is also envisaged to employ a combination of two or more of the above protective colloids.

The protective colloid can be in a pure form or be diluted in an appropriate solvent, which in the case of PVA preferably is water or a mixture of water and an alcohol. Aqueous solutions may contain at least 0.5% PVA by weight, more preferably at least 1% by weight, and most preferably at least 2% by weight, and at most 10% PVA by weight, more preferably at most 5% by weight, and most preferably at most 4% by weight.

The amount of protective colloid to be used in the process according to the invention is within the lower ranges as conventionally used in polymerization processes. Typically, this range has a lower limit of 0.01% w/w of protective colloid and more preferably 0.02% w/w, and an upper limit of 1% w/w of protective colloid, preferably 0.3% w/w, and most preferably 0.15% w/w, based on the weight of the monomer(s) to be polymerized, is used.

In the process according to the invention, one or more initiators can be used. These initiators can be any kind of organic peroxide suitable for use in the polymerization process, such as peroxydicarbonates and acetyl-cyclohexyl-sulfonyl-peroxide. More preferred initiators are fast initiators such as organic peroxides having a half-life of from 0.0001 to 1 hour. Even more preferred are peroxides having a half-life ranging from 0.0001 to 0.5 hour.

Preferred examples of organic peroxides used in the process of the invention are 1,1,3,3-tetramethylbutylperoxy methoxy acetate, tert-butylperoxy methoxy acetate, tert-amylperoxy methoxy acetate, tert-butylperoxy ethoxy acetate, diisobutanoylperoxide (Trigonox® 187), hexanoyl pivaloyl peroxide, 2-ethyl-butanoyl-isononanoyl peroxide, isobutanoyl-lauroyl peroxide, isobutanoyl-isononanoyl peroxide, bis(tert-butylperoxy) oxalate, cyclododecyl-tert-butylperoxy oxalate, 2,2-bis-2-ethylhexanoylperoxy-4-methylpentane, 2,2-bis-2-ethylbutanoylperoxy-4-methylpentane, 2,2-bis(2,2-dimethylpropanoylperoxy)-4-methyl pentane, 1-(2-ethylhexanoylperoxy)-1,3-dimethylbutyl-1-peroxypivalate (Trigonox® 267) or 2,4,4-trimethylpentyl-2-peroxyneodecanoate (Trigonox® 423), tert-amyl peroxyneodecanoate (Trigonox® 123), tert-butyl peroxyneo-decanoate (Trigonox® 23), benzene (m,p)di(2-isopropyl-2-peroxyneo-decanoate), 2-methyl-4-hydroxypentane-2-peroxyneodecanoate, α-cumyl peroxyneodecanoate (Trigonox® 99), and peroxydicarbonates such as di-sec-butylperoxy-dicarbonate (Trigonox® SBP), di(4-tert-butylcyclohexyl)peroxydicarbonate (Perkadox® 16) and di(2-ethylhexyl)peroxydicarbonate (Trigonox® EHP). Other organic peroxides having half-lives ranging from 0.0001 to 1 hour at polymerization temperature can also be used. Whether a peroxide is suitable and has the required half-life can be determined by conventional thermal decomposition studies in monochlorobenzene, as is well-known in the art (see for instance the brochure "Initiators for high polymers" with code 10013921001 obtainable from Akzo Nobel).

In the process of the invention it is not very efficient to use the fast initiators during the polymerization stage where the contents of the reactor are heated to the desired polymerization temperature, the so-called cold-start process. If so desired, however, one or more of the fast and/or more conventional initiators can be used at this stage. If a conventional initiator is used, this initiator will preferably be introduced into the reaction mixture prior to or just after the heating step, when the conversion, or degree of polymerization, is less than 80%, preferably less than 50%, more preferably less than 30%, even more preferably less than 10%, and most preferably less than 2% of all monomer used in the process.

If the reaction mixture is formulated at or near the polymerization temperature, the so-called warm-start process, it is not required to add a certain amount of initiator at the start while the remainder is metered over time. However, also in this warm-start process it can be beneficial to add up to 60% w/w, more preferably up to 40% w/w, even more preferably up to 25% w/w, even more preferably up to 10% w/w, even more preferably up to 4% w/w, even more preferably up to 2% w/w, and most preferably up to 1% w/w, of all initiator immediately after formation of the reaction mixture, with the remainder being metered over time. This procedure is particularly preferred if a certain amount of polymerization inhibitor (a radical trapping species) is present in the reaction mixture. If such a radical scavenger is present, for instance because it is introduced with the monomer where it is typically used as a stabilizer, the initially metered initiator will react with said stabilizer, thus preventing a delayed start of the polymerization reaction.

The amount of initiator (or initiators) to be used in the process according to the invention is within the range conventionally used in polymerization processes. Typically, this range has a lower limit of 0.01% w/w of initiator and more preferably of 0.02% w/w, and an upper limit of 1% w/w of initiator, preferably of 0.3% w/w; most preferably, 0.2% w/w, based on the weight of the monomer(s) to be polymerized, is used.

The initiator is metered to the reactor in the pure form or, preferably, in the form of a dilute solution or dispersion (such as a suspension or emulsion). One or more suitable solvents can be used to dilute the initiator. Preferably, such solvents are easily removed during the steps where the polymer is worked up after the polymerization process, such as alcohols, or they are of such a nature that it is acceptable to leave them as a residue in the final polymer, as in the case of solvents that are desired plasticizers for the final resin. Furthermore, it can be advantageous, but is not necessarily required, that such solvents do not adversely affect the thermal stability of the initiator dissolved therein, as can be verified by analyzing the half-life temperature of the initiator in said solvent. An example of such a solvent is isododecane. If initiator dispersion is metered, then the dispersion can be of either the initiator itself or of a solution of the initiator, preferably in said suitable solvents. Preferably, the dispersion is an aqueous dispersion. Preferably, the initiator is metered in a concentration of at least 0.1% w/w, more preferably 0.5% w/w, and most preferably 2% w/w, and at most 75% w/w, more preferably at most 60% w/w, even more preferably at most 50% w/w, even more preferably 25% w/w, and most preferably 15% w/w. The more dilute initiator solutions or dispersions ensure rapid mixing of the initiator and the polymerization mixture, which leads to a more efficient use of the initiator, which is important for the fast initiators that are used.

During the polymerization reaction the fast initiator and the protective colloid can be added simultaneously or separately either in an alternating way or sequentially in random order at the polymerization temperature. A portion of the protective colloid may be added to the reaction mixture before the addition of the initiator during either a cold-start or a warm-start process. This is to ensure that the monomer to be polymerized is properly dispersed in the reaction mixture. This portion can be at least 1% of the total amount of protective colloid, preferably at least 5%, and most preferably at least 10%, and at most 50%, preferably at most 30%, and most preferably at most 20%. The remaining portion is then added as described below.

Portions of the initiator and of the protective colloid can be added separately either in an alternating way or sequentially in random order to the reactor at at least 2, preferably at least 4, more preferably at least 10, and most preferably at least 20 moments. The amount of initiator may be the same or may vary with each portion or with a number of initiator portions. It may be varied such that each subsequent (number of) initiator portion(s) contains more (or less) initiator, as desired. The amount of protective colloid within each colloid portion may be the same or varied individually or group-wise in a manner analogous to the initiator portions.

Metering of the fast initiators and the protective colloid can also proceed simultaneously, and this can be done intermittently or continuously over a period of time during which at least 20%, preferably at least 40%, more preferably at least 60% of all monomer used in the process is polymerized. If an intermittent operation is selected, there are at least 2, preferably at least 4, more preferably at least 10, and most preferably at least 20 moments at the polymerization temperature at which the initiator and the protective colloid are metered. If so desired, the intermittent and the continuous operation can be combined, such that the initiator and/or the protective colloid are metered intermittently for certain (longer or shorter) periods of time. Most preferably, the initiator and the protective colloid are metered continuously and/or intermittently after at least 1%, preferably at least 5%, more preferably at least 10%, even more preferably at least 20%, most preferably at least 30% of the monomer(s) has already been polymerized, with at least 10%, preferably at least 20%, more preferably at least 30%, and most preferably at least 50% of all monomer used in the process being polymerized during the metering period.

The amounts of initiator and protective colloid may be the same or may vary (also with respect to one another) with each portion or with a number of intermittently metered portions. They may be varied such that each subsequent initiator portion contains more (or less) initiator, as desired. When the initiator and the protective colloid are continuously metered, their amounts may be constant or they may gradually increase (or decrease) during the metering operation; also in this case, the amounts of initiator and protective colloid can vary with respect to one another, in which process one of the two components can be kept at a constant amount. Optionally, but less desired, the initiator and/or protective colloid that is dosed is combined with water and/or monomer, e.g. to counteract the reduction of the volume of the polymerization mixture, or to facilitate the transfer of the initiator to the monomer to be polymerized.

Preferably, the metering of initiator and PVA can be effected at any suitable entry point to the reactor. Such an entry point may be positioned below or above the surface of the reaction mixture, as desired. The initiator and the protective colloid can be added separately to the reactor via two individual entry points, or they can be pre-mixed and enter the reactor through one entry port. If water is added in the course of the polymerization process, for example to compensate for the shrinkage of the reactor content due to the polymerization reaction, it can be advantageous to use the line through which this water is metered to also meter the initiator and/or the protective colloid. It can also be envisaged that the reactor comprises a plurality of entry points located in different positions on the periphery of the said reactor, so as to ensure better, faster, and more homogeneous mixing of the initiator and/or the protective colloid in the reaction mixture. If the reactor further comprises a reflux condenser, it is contemplated to add the protective colloid to the reaction mixture via the reflux condensor through one or more entry points.

The polymerization process can be conducted as a mass process wherein the reaction mixture is predominantly monomer, or as a more preferred suspension process wherein the reaction mixture typically is a (micro)-suspension of monomer in water, or as an emulsion or micro-emulsion process wherein the monomer typically is emulsified in water. In these processes the usual additives will have to be used. For example, if the monomer is present in the form of a suspension in water, the usual additives like surfactant(s), anti-fouling agent(s), pH-buffer(s), etc. may be present. Depending on the type of polymer desired, each of the above-mentioned processes may be preferred. Due to the low amount of protective colloid that is needed, the process according to the invention is especially suited for use in micro-suspension or suspension processes. Most preferably it is a suspension polymerization process.

The said mass and preferred suspension processes can be conducted batch-wise or in a continuous reactor. In a batch-wise process, polymerization of the monomer proceeds and ends in one reactor, after which the resulting polymer is removed from the reactor and isolated. The polymerization process can also be conducted in a continuous reactor, with the amount of monomer, which enters the reactor remaining in the reactor for a certain period of time, i.e. the residence time, before leaving the reactor. The residence time is chosen long enough for at least 1%, preferably at least 5%, and most preferably at least 10%, and at most 99%, preferably at most 96%, more preferably at most 90%, and most preferably at most 85% of the amount of monomer entering the reactor to be polymerized before leaving the reactor. The resulting polymer is at least partially removed from the reactor or from the fluid flowing out, and subsequently isolated. Upon removal of the polymer, a new portion of monomer is added to the reactor, to at least partially compensate for the polymerized amount of monomer removed. In this way, the space-time yield is further improved compared to batch-wise processes.

The process according to the invention makes it possible to perform the polymerization reaction within 4 hours, preferably within 3 hours, more preferably within 2 hours, and most preferably within 1 hour. The polymerization time can be defined as the period within which monomers are polymerized at a still significant polymerization rate. In cases where a constant pressure in the reactor is observed followed by a pressure drop, the polymerization time at least encompasses this constant pressure time. In a continuous process, the pressure does not drop or drops only slightly, so that in effect the reactor always has a constant pressure. In such an event, the percentage (w/w) of polymer formed relative to the totally added monomer per hour, or the percentage (w/w) of monomer converted per hour relative to the totally added monomer per hour gives a good indication of the polymerization rate. The said polymerization time is dependent on the amount and the type of initiator used, the amount and the type of protective colloid, the way in which the protective colloid and the initiator are metered, the reaction temperature, etc. By choosing the right parameters, the said time can be minimized, thus further improving the reactor space-time yield.

After the polymerization, the resulting (co)polymer (or resin) will be worked up as is usual in the art. Polymers obtained by a suspension polymerization according to the invention, for example, will be submitted to the usual drying and screening steps. The resulting resin preferably is characterized in that it contains less than 50 ppm of residual initiator, more preferably less than 40 ppm, and most preferably less than 25 ppm of initiator, immediately after drying for 1 hour at 60° C. and screening. The resin was found to exhibit excellent heat stability as measured with a Metrastat® PSD260 testing oven in accordance with ISO 182-2 (1990E). The improved heat stability proved that the resin hardly discolored when submitted to melt-processing steps, e.g., to form shaped articles.

Non-limitative examples to demonstrate the unexpected effect of PVA co-metering in the continuous metering of peroxides during PVC suspension polymerization are presented below. The examples have not been optimized.

Experimental

In a standard suspension polymerization experiment, a temperature controlled 1-liter stainless steel Büchi reactor equipped with one baffle, a three-bladed stirrer, a pressure transducer, a vinyl chloride (VCM) feed line, and a nitrogen purge line was charged with: 425 g demineralized water, Alcotex® B72 (polyvinyl-acetate/alcohol) in a 5% solution in demineralized water, the amounts and metering procedures (warm-start and continuous peroxide metering) as mentioned in Tables 1 and 2, and pressurized to 15 barg, using nitrogen. If no leaks are observed, the reactor is evacuated and pressurized with nitrogen up to 5 barg three times to flush out virtually all air. Next, the reactor was evacuated and charged with 250 g VCM ex Akzo Nobel Salt & Basics, followed by heating of the reactor to polymerization temperature in 30–60 min. The initiator and protective colloid amounts and the metering procedure are also mentioned in Tables 1 and 2. After a pressure drop of 2–3 bar in the reactor or 4.5 hours of reaction time, whichever came first, the polymerization was continued for another half hour without metering initiator and/or protective colloid, and then the reactor was cooled to 20–25° C., evacuated, and freed of virtually all remaining VCM. The polymer was obtained after filtration, washing, and drying (at 60° C. for 1 hour using a fluidized bed). The time until the pressure drops in the reactor is the constant pressure time (CPT). Using the above experimental set-up, differences of 5 minutes in CPT are considered to be significant.

The heat formed during the polymerization process is measured and cooling adapted to the heat formed. The more heat is generated at a certain time, the more difficult it will be to control the temperature of the reaction mixture. A low heat peak together with high polymer yields is preferred, since then an optimum in the space-time yield of the reactor can be attained.

EXAMPLES

Two initiators were used viz. Trigonox® 187 and Trigonox® 267. The metering procedure and the polymerization results of each individual initiator are represented in Tables 1 and 2.

After reaching the polymerization temperature, the tabulated parts of Trigonox® 187 (or Trigonox® 267) per million parts of VCM (metered as a 0.8% w/w methanol solution) was metered over the period of time mentioned. After the first metering, the metering speed was reduced to a lower level (see tabulated quantity and time). In the case of PVA co-metering, the solution of Trigonox® 187 (or Trigonox® 267) and the PVA solution in water were mixed and stirred continuously.

TABLE 1

Results of VCM suspension polymerization with Trigonox ® 187 at 57° C. according to the procedure for continuous metering.

| | Example 1 | Comparison example |
|---|---|---|
| PVA quantity used | Continuous metering of peroxide and PVA solution 200 ppm added before heating and subsequently 800 ppm metered in 220 min together with the peroxide | Continuous metering of peroxide 1,000 ppm added in 2 minutes at polymerization time |
| Peroxide quantity used | 1,000 ppm on VCM | 1,000 ppm on VCM |
| Peroxide metering procedure | 330 ppm peroxide added over 12 min and subsequently 670 ppm over 220 min | 330 ppm peroxide added over 12 min and subsequently 670 ppm over 245 min |
| Constant pressure time | 195 min | 215 min |
| Pressure drop rate | 4.5 bar/hr | 4 bar/hr |
| Polymerization time | 4.5 hrs | 4.8 hr |
| PVC yield | 86% | 87% |

TABLE 2

Results of VCM suspension polymerization with Trigonox ® 267 at 57° C. according to the continuous peroxide metering procedure.

| | Example 2 | Comparison example |
|---|---|---|
| PVA quantity used | Continuous metering of peroxide and PVA solution 200 ppm added before heating and subsequently 800 ppm metered in 120 min together with the peroxide | Continuous metering of peroxide 1,000 ppm added in 2 minutes at polymerization time |
| Peroxide quantity used | 1,600 ppm on VCM | 1,600 ppm on VCM |
| Peroxide metering procedure | 480 ppm peroxide added over 15 min and subsequently 1,120 ppm over 120 min | 480 ppm peroxide added over 15 min and subsequently 1,120 ppm over 120 min |
| Constant pressure time | 115 min | 120 min |
| Pressure drop rate | 3 bar/hr | 2 bar/hr |
| Polymerization time | 3.2 hrs | 3.5 hr |
| PVC yield | 87% | 83% |
| PVC porosity (DOP absorption | 21.9% | 15.2% |

Examples 1 and 2 show that co-metering the peroxide and the PVA results in a significantly shorter CPT, indicating a faster polymerization rate resulting in a shorter polymerization time and a faster pressure drop. In effect, less peroxide can be used to obtain similar reactor space-time yields (PVC yield) when the peroxide and the PVA are co-metered. Table 2 further shows that co-metering leads to a significantly improved porosity of the resulting polymer.

The invention claimed is:

1. A process of polymerizing a polymerization mixture comprising at least one monomer wherein at least an organic initiator and 0.01–1 wt.% of a protective colloid, based on the weight of the monomers to be polymerized, are metered to the polymerization mixture at a polymerization temperature by (a) adding portions of the initiator and the protective colloid separately in an alternating way or sequentially in random order of at least 2 moments, (b) by metering at least part of the initiator and at least part of the protective colloid intermittently and/or continuously, over a period of time during which at least 20% of all monomer used in the process is polymerized, or (c) by metering the initiator and the protective colloid continuously and/or intermittently after at least 1% of the monomer(s) has already been polymerized, with at least 10% of all monomer used in the process being polymerized during the metering period.

2. The process according to claim 1 wherein at least one of the monomers is vinyl chloride.

3. The process according to claim 1 wherein the protective colloid is a polyvinyl alcohol.

4. The process according to claim 1 wherein the organic initiator has a half-life of from 0.0001 hour to 1 hour at the polymerization temperature.

5. The process according to any one of claims 1–4 wherein the initiator and the protective colloid are at least partially metered simultaneously.

6. The process according to any one of claims 1–4 wherein the metering of the initiator and the protective colloid is controlled such that the maximum cooling capacity of the reactor is used.

7. The process according to any one of claims 1–4 wherein the polymerization time of a batch process or the residence time of a continuous process is shorter than 4 hours.

8. A process according to claim 3 wherein the polyvinyl alcohol is a saponified polyvinyl alcohol with a degree of hydrolysis of between 40 and 90%.

9. A process according to claim 4 wherein the half life of the initiator is from 0.0001 hour to 0.5 hour.

10. A process according to claim 1 wherein at least part of the initiator and the protective colloid is metered, intermittently and/or continuously, after at least 10% of the monomer(s) has already been polymerized and wherein during the metering period at least 30% of all monomer used in the process is polymerized.

* * * * *